US009798990B2

(12) United States Patent
Weng et al.

(10) Patent No.: US 9,798,990 B2
(45) Date of Patent: Oct. 24, 2017

(54) MATERIAL MANAGEMENT AND CONTROL SYSTEM

(71) Applicants: HEFEI Xinsheng Optoelectronics Technology Co., Ltd., Hefei (CN); BOE Technology Group Co., Ltd., Beijing (CN)

(72) Inventors: Mingting Weng, Beijing (CN); Zhiguang Guo, Beijing (CN); Sixiang Wu, Beijing (CN); Dafu Cheng, Beijing (CN)

(73) Assignees: Hefei Xinsheng Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 410 days.

(21) Appl. No.: 14/235,979

(22) PCT Filed: Dec. 12, 2013

(86) PCT No.: PCT/CN2013/089228
§ 371 (c)(1),
(2) Date: Jan. 29, 2014

(87) PCT Pub. No.: WO2014/201817
PCT Pub. Date: Dec. 24, 2014

(65) Prior Publication Data
US 2015/0310369 A1 Oct. 29, 2015

(30) Foreign Application Priority Data
Jun. 21, 2013 (CN) .......................... 2013 1 0249868

(51) Int. Cl.
G06Q 10/00 (2012.01)
G06Q 10/06 (2012.01)
G06Q 10/08 (2012.01)

(52) U.S. Cl.
CPC ....... *G06Q 10/06315* (2013.01); *G06Q 10/06* (2013.01); *G06Q 10/087* (2013.01)

(58) Field of Classification Search
CPC .. G06Q 10/08; G06Q 10/087; G06Q 10/0875; G06Q 10/06; G06Q 20/203
(Continued)

(56) References Cited

U.S. PATENT DOCUMENTS 5,126,935 A * 6/1992 Saitou .................. G06Q 20/203
235/383
6,327,576 B1 * 12/2001 Ogasawara ............ G06K 17/00
705/22
(Continued)

FOREIGN PATENT DOCUMENTS

CN 102592206 A 7/2012
CN 102646247 A 8/2012
(Continued)

OTHER PUBLICATIONS

Mar. 29, 2016—(CN)—Second Office Action Appn 201310249868.0 with English Tran.
(Continued)

*Primary Examiner* — Andrew Joseph Rudy
(74) *Attorney, Agent, or Firm* — Banner & Witcoff, Ltd.

(57) ABSTRACT

An embodiment of the present invention discloses a material management and control system, which comprises: a code scanner, which performs code scanning operation on any material to be warehoused with respect to the material to be warehoused to obtain code scanning parameter information of the material to be warehoused, wherein the code scanning parameter information comprises at least a date when a life of the material to be warehoused is exhausted; and a processor, which determines whether a remaining life of the material to be warehoused is not less than a set life value or
(Continued)

not according to the code scanning parameter information obtained by the code scanner, and if a result is yes, then perform warehousing operation on the material to be warehoused, and monitor whether the warehoused material arrives at its corresponding life exhausting date or not, and if the result is not, then perform subsequent material processing operation on the warehoused material according to a set operation procedure. The embodiment of the present invention can greatly avoid the problems of low management and control efficiency and relatively high error rate caused by manual material management, achieve computerization of material management and control during the ODF process, and improve the processing efficiency and accuracy of the material management and control.

17 Claims, 4 Drawing Sheets

(58) Field of Classification Search
 USPC ................................................. 705/28, 30
 See application file for complete search history.

(56) References Cited

U.S. PATENT DOCUMENTS

| | | | | |
|---|---|---|---|---|
| 6,826,119 B2* | 11/2004 | Fortune | G07G 1/0045 | 235/462.01 |
| 6,963,851 B1* | 11/2005 | Szabo | G06Q 30/02 | 186/56 |
| 6,965,871 B1* | 11/2005 | Szabo | G06Q 10/087 | 186/56 |
| 7,009,519 B2* | 3/2006 | Leonard | B05B 11/0054 | 235/375 |
| 7,051,936 B2* | 5/2006 | Watanabe | G06K 7/10851 | 235/462.01 |
| 7,072,855 B1* | 7/2006 | Godlewski | G06Q 10/087 | 700/216 |
| 7,185,810 B2* | 3/2007 | White | G06Q 10/087 | 235/385 |
| 7,406,439 B2* | 7/2008 | Bodin | G06K 19/07758 | 340/572.1 |
| 7,464,872 B2* | 12/2008 | Doerwald | G06Q 10/087 | 235/383 |
| 7,577,596 B2* | 8/2009 | Antonuk | G06Q 10/087 | 235/385 |
| 8,429,048 B2* | 4/2013 | Singh | G06Q 20/20 | 705/35 |
| 8,463,651 B2* | 6/2013 | Connors | G06Q 10/0833 | 705/22 |
| 8,538,829 B1* | 9/2013 | Hu | G06Q 10/087 | 705/26.1 |
| 9,223,878 B2* | 12/2015 | Ramer | G06F 17/30867 | |
| 2002/0120534 A1* | 8/2002 | Howard | G06Q 10/087 | 705/28 |
| 2003/0204450 A1* | 10/2003 | Heinrichs | G06Q 10/087 | 705/28 |
| 2003/0216974 A1* | 11/2003 | Browne | G06F 19/327 | 705/28 |
| 2005/0261991 A1* | 11/2005 | Kennamer | G06Q 10/087 | 705/28 |
| 2006/0022826 A1* | 2/2006 | Higham | G06Q 10/087 | 340/572.1 |
| 2006/0178947 A1* | 8/2006 | Zsigmond | B07C 5/34 | 705/26.1 |
| 2007/0089433 A1* | 4/2007 | McDonnell | A23L 3/00 | 62/115 |
| 2007/0235528 A1* | 10/2007 | Spencer | G06Q 10/087 | 235/383 |
| 2008/0015958 A1* | 1/2008 | Vanker | G06Q 10/087 | 705/28 |
| 2009/0009334 A1* | 1/2009 | Smith, Jr. | G06Q 10/087 | 340/572.4 |
| 2009/0095813 A1* | 4/2009 | Chang | G06Q 10/087 | 235/385 |
| 2010/0057591 A1* | 3/2010 | Bhogal | G06Q 10/06 | 705/28 |
| 2010/0187306 A1* | 7/2010 | Solomon | B65G 1/127 | 235/385 |
| 2011/0282476 A1* | 11/2011 | Hegemier | G06Q 30/0621 | 700/100 |
| 2012/0080517 A1* | 4/2012 | Braunstein | G07F 9/026 | 235/379 |
| 2012/0175412 A1* | 7/2012 | Grabiner | G06Q 30/0623 | 235/375 |
| 2012/0278190 A1* | 11/2012 | Brown | G06Q 10/087 | 705/21 |
| 2013/0262330 A1* | 10/2013 | Sannier | G06Q 10/08 | 705/318 |
| 2014/0156423 A1* | 6/2014 | Argue | G06Q 20/0453 | 705/16 |
| 2014/0252085 A1* | 9/2014 | Kim | G06Q 10/08 | 235/375 |
| 2014/0316799 A1* | 10/2014 | Cosgrove | G06F 19/3462 | 705/2 |
| 2014/0351098 A1* | 11/2014 | Shafer | G06Q 10/087 | 705/28 |

FOREIGN PATENT DOCUMENTS

| | | |
|---|---|---|
| CN | 103353958 A | 10/2013 |
| JP | 4672122 B2 | 4/2011 |
| JP | 2011-159071 A | 8/2011 |

OTHER PUBLICATIONS

Oct. 10, 2015—(CN)—First Office Action Appn 201310249868.0 with English Tran.
International Search Report for PCT/CN2013/089228 dated Mar. 20, 2014, 12pgs.
Dec. 22, 2015—International Preliminary Report on Patentability Appn PCT/CN2013/089228.
English abstract of CN102592206A.
English abstract of CN103353958A.
English abstract of CN102646247A.
English abstract of JP2011-159071A.

* cited by examiner

MATERIAL MANAGEMENT AND CONTROL SYSTEM

CROSS REFERENCE TO RELATED APPLICATIONS

This application is based on International Application No. PCT/CN2013/089228 filed on Dec. 12, 2013, which claims priority to Chinese National Application No. 201310249868.0 filed on Jun. 21, 2013, the contents of which are incorporated herein by reference.

TECHNICAL FIELD

Embodiments of the present invention relate to a field of material management and control technology, in particularly, to a material management and control system for a process of liquid crystal one drop filling (ODF).

BACKGROUND

During current ODF process, the material management and control such as the management and control of sealant, the management and control of liquid crystal, and the management and control of the mixture of gold balls and glass fibers (such as silicon balls), are mainly performed by a manual manner. The number of the related paper tables to be written in the procedure of the material management and control is very large, and with any paper tables, it is necessary for the related management staffs of the departments of production plan and manufacturing to manually sign and confirm many times. Taking the current management and control of sealant as an example, if it is managed and controlled by a manual manner, with respect to any one material equipment, it needs to fill many tables by a manual manner, for example, it generally needs to fill more than ten tables and more than 200 items, and with respect to any table, it necessary for the related management staff of the departments of production plan and manufacturing to sign and confirm up to dozens of times by manpower. This may cause the whole procedure of material management and control to be very time-consuming, and the phenomenon of material management and control errors caused by misusing material model, the using amount of the material not complying with the provision, or the life of the material expiring and so on will happen frequently, which greatly reduces the processing efficiency and accuracy of the material management and control.

SUMMARY

An embodiment of the present invention provides a material management and control system, which can solve the problems of low management and control efficiency and relatively high error rate caused by manual material management and control existed in the prior art.

An embodiment of the present invention provides a material management and control system, and the system comprises:

a code scanner, which performs code scanning operation on any material to be warehoused with respect to the material to be warehoused to obtain code scanning parameter information of the material to be warehoused, wherein the code scanning parameter information comprises at least a date when a life of the material to be warehoused is exhausted; and a processor, which determines whether a remaining life of the material to be warehoused is not less than a set life value or not according to the code scanning parameter information obtained by the code scanner, and if a result is yes, then perform warehousing operation on the material to be warehoused, and monitor whether the warehoused material arrives at its corresponding life exhausting date or not, and if the result is not, then perform subsequent material processing operation on the warehoused material according to a set operation procedure.

The solution of the embodiment of the present invention can greatly avoid the problems of low management and control efficiency and relatively high error rate caused by manual material management, achieve computerization of material management and control during the ODF process, and improve the processing efficiency and accuracy of the material management and control.

DETAILED DESCRIPTION

The embodiments of the present invention are further described below in connection with the drawings; however, the present invention is not limited to the following embodiments.

First Embodiment

Figure 1:
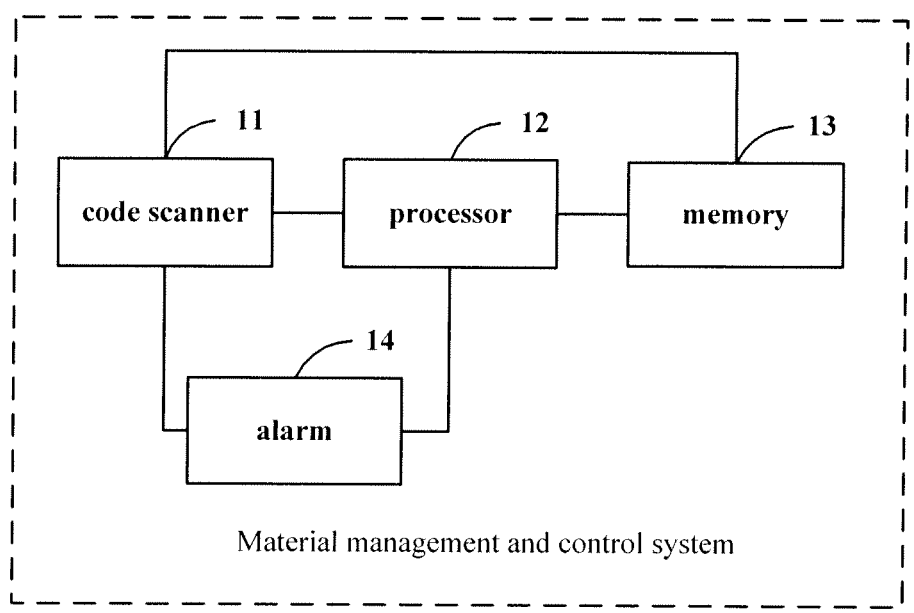
FIG. 1 is a structural schematic view illustrating a material management and control system according to a first embodiment of the present invention.

FIG. 1 is a structural schematic view illustrating a material management and control system according to a first embodiment of the present invention. The material management and control system can be applied in the technical field of ODF process, and comprises a code scanner 1 and a processor 12.

With respect to any material to be warehoused, the code scanner 11 performs code scanning operation on the material to be warehoused, so as to obtain code scanning parameter information of the material to be warehoused; the code scanning parameter information comprises at least the date when the life of the material to be warehoused is exhausted.

In particular, in the embodiment of the present invention, with respect to any material to be warehoused, a barcode may be provided in advance; the barcode may uniquely identify the material to be warehoused, and after completing the barcode configuration, with respect to any material to be warehoused, use the pre-configured barcode, and perform a code-scanning operation on the material to be warehoused, to obtain the related code scanning parameter information of the material to be warehoused.

The materials to be warehoused may comprise one or more materials of sealant, liquid crystal, and mixture of gold balls and glass fibers, and so on. It is to be noted that the materials to be warehoused may further comprise other related materials during manufacturing a display device or during the ODF process, and the embodiment of the present invention does not impose any restriction on it.

Further, with respect to any material to be warehoused, except the date when the life of the material to be warehoused is exhausted, the obtained code scanning parameter information of the material to be warehoused may further comprise one or more of the following information: product model, product category, manufacturer, scanning number, and scanning date, and so on for the material to be warehoused, and the embodiment of the present invention does not impose any restriction on it.

The processor 12 can determine whether the remaining life of the material to be warehoused is not less than the set life value or not, according to the code scanning parameter information obtained by the code scanner, and if the answer is yes, perform warehousing operation on the material to be warehoused, and monitor whether the warehoused material arrives at its corresponding life exhausting date or not; if the answer is no, perform subsequent material processing operation on the warehoused material according to a set operation procedure.

The set life value may be zero, or may be any of other nonzero values, and the embodiment of the present invention does not impose any restriction on it. Preferably, in order to guarantee a relatively long usable life of each material to be warehoused, in the described embodiment of the present invention, the set life value may be set to any nonzero value.

In particular, the processor 12 may determine whether the remaining life of the material to be warehoused is not less than a set life value or not according to the following manner:

where the life exhausted date of the material to be warehoused is after the scanning date, the difference value between the life exhausted date of the material to be warehoused and the scanning date is taken as the remaining life of material to be warehoused, and where the difference value is not less than a set life value, it can be recognized that the remaining life of the material to be warehoused is not less than the set life value;

where the life exhausted date of the material to be warehoused is prior to the scanning date, since the total life of the material to be warehoused is exhausted, it can be directly recognized that the remaining life of the material to be warehoused is less than the set life value;

where the life exhausted date of the material to be warehoused is the same as the scanning date, if the set life value is nonzero, it can be recognized that the remaining life of the material to be warehoused is less than the set life value; if the set life value is zero, it can be recognized that the remaining life of the material to be warehoused is not less than the set life value.

Further, with respect to any material to be warehoused, the processor 12 can judge whether the warehoused material reaches the corresponding life exhausted date soon, by computing the difference value between the life exhausted date of the warehoused material and the current monitoring time and judging if the difference value is not greater than a set second life value. In particular, when the difference value is less than or equal to the set second life value, it can be recognized that the warehoused material will reach corresponding life exhausted date soon.

The size of the second life value may be set according to actual circumference, and the embodiment of the present invention does not impose any restriction on it, for example, the second life value may be se to 5~8 hours, etc.

Further, with respect to any warehoused material, prior to performing subsequent material processing operation on the warehoused material, the code scanner 11 may further perform second code scanning on the warehoused material to obtain second code scanning parameter information, and transfer the obtained second code scanning parameter information to the processor 12, and the processor 12 may perform subsequent material processing operation on the warehoused material according to the second code scanning parameter information.

In particular, when the warehoused material involves sealant, the processor 12 may perform subsequent material processing operation on the warehoused material according to the following set operation flow:

receiving the second code scanning parameter information obtained when the code scanner 11 performs the second code scanning operation, wherein the second code scanning parameter information of the sealant may comprise at least the product model information of sealant, and in particular, the second code scanning parameter information of the sealant may further comprise product category, manufacturer, current remaining life, life exhausted date, warehoused date, and so on for the sealant, and the embodiment of the present invention do not impose any restriction on it;

performing information comparison between the product model information obtained in the second code scanning parameter information of the sealant and preset product model information needed by the material processing operation at this time, and if the comparison result is identical, sequentially performing operations of defrosting and defoaming treatment according to the sealant defrosting parameter information and the sealant defoaming parameter information in the preset material standard information; and performing filling treatment operation of the sealant after performing defrosting and defoaming treatment, and where the life of the sealant after the filling treatment operation is not less than a preset second life value, loading the sealant after the filling treatment operation into the sealant coating equipment, to complete the operation of loading the sealant into an equipment.

In particular, the material standard information related to the present sealant processing operation can be preset by the manner of manually inputting and setting before performing warehousing operation on the sealant, and the embodiment of the present invention does not impose any restriction on it. In particular, where the warehoused material is sealant, the preset material standard information may comprise sealant model information, sealant defrosting parameter information, sealant defoaming parameter information, sealant filling parameter information, and so on which are needed by the present sealant processing operation, and the embodiment of the present invention does not impose any restriction on it.

Further, where the warehoused material is liquid crystal, the processor 12 may perform subsequent material processing operation on the warehoused material according to the following set operation flow:

receiving second code scanning parameter information obtained when the code scanner 11 performs the second code scanning operation on the liquid crystal, wherein the second code scanning parameter information of the liquid crystal may comprise at least the product model information of the liquid crystal and the resistivity parameter information of the liquid crystal; further, the second code scanning parameter information of the liquid crystal may comprise product category, manufacturer, current remaining life, life exhausted date, warehoused date, and so on of the liquid crystal, and the embodiment of the present invention does not impose any restriction on it;

performing information comparison between the product model information obtained in the second code scanning parameter information of the liquid crystal and a preset product model information needed by the material processing operation at this time, and if the comparison result is identical, further performing information comparison between the resistivity parameter information obtained in the code scanning parameter information of the liquid crystal and the resistivity parameter information of the liquid crystal in a preset material standard information, if the comparison result is still identical, performing defoaming treatment operation according to the liquid crystal defoaming parameter information in the preset material standard information, and after performing the defoaming treatment operation, loading the liquid crystal into a preset liquid crystal coating equipment, to complete the operation of loading the liquid crystal into an equipment.

In particular, the material standard information related to liquid crystal processing operation of this time may be preset by the manner of manually inputting and setting before performing warehousing operation on the liquid crystal, and the embodiment of the present invention does not impose any restriction on it. In particular, where the warehoused material is liquid crystal, the preset material standard information may comprise liquid crystal model information, liquid crystal resistivity parameter information, liquid crystal defoaming parameter information and so on which are needed by the present liquid crystal processing operation, and the embodiment of the present invention does not impose any restriction on it.

Further, where the warehoused material is the mixture of gold balls and glass fibers, the processor 12 may perform subsequent material processing operation on the warehoused material according to the following set operation flow:

receiving second code scanning parameter information of the mixture of gold balls and glass fibers obtained when the code scanner 11 performs the second code scanning operation on the mixture of gold balls and glass fibers, wherein the second code scanning parameter information of the mixture of gold balls and glass fibers may comprise at least the product model information of the mixture of gold balls and glass fibers; in addition, the second code scanning parameter information of the mixture of gold balls and glass fibers may comprise product category, manufacturer, current remaining life, life exhausted date, warehoused date, and so on of the mixture of gold balls and glass fibers, and the embodiment of the present invention does not impose any restriction on it;

performing information comparison between the product model information obtained in the second code scanning parameter information of the mixture of gold balls and glass fibers and a preset product model information needed by the material processing operation at this time, and if the comparison result is identical, according to the mixing operation parameter information in the preset material standard information (that is, the corresponding mixing operation parameter information for performing mixing operation on the mixture of gold balls and glass fibers and the corresponding sealant), performing mixing processing operation on the mixture of gold balls and glass fibers and the sealant needed by the present material processing operation, and after the mixing processing operation, sequentially performing defoaming and filling processing operations on the mixed material obtained after the mixing processing operation, according to the sealant defoaming parameter information and the sealant filling parameter information in the preset material standard information.

In particular, the material standard information related to the present mixture processing operation of the mixture of gold balls and the glass fibers may be set in a manner of manually inputting and setting before performing warehousing operation on the mixture of gold balls and glass fibers, and the embodiment of the present invention does not impose any restriction on it. In particular, where the warehoused material is the mixture of gold balls and glass fibers, the preset material standard information may comprise product model information and mixing operation parameter information for the mixture of gold balls and glass fibers and so on which are needed by the present material processing operation, and the embodiment of the present invention does not impose any restriction on it.

Further, the material management and control system may further comprise a memory 13. The memory 13 may be connected with the code scanner 11 and the processor 12 respectively, and used to store the information such as the preset material standard information, the product model information needed by each material processing operation, and so on. Further, with respect to any material to be warehoused which meets the requirement for warehousing, the memory 13 may further store the code scanning parameter information and the second code scanning parameter information, and so on for the warehoused material which corresponds to the material to be warehoused.

Further, the memory 13 may further store information such as the operation records and so on which are generated when the processor 12 performs subsequent material processing operation on various warehoused materials, and the embodiment of the present invention does not impose any restriction on it.

Further, in the embodiment of the present invention, the processor 12 may further, with respect to any material to be warehoused, if the remaining life of the material to be warehoused is determined to be less than the set life value, refuse to perform warehousing operation on the material to be warehoused; or, with respect to any warehoused material, if the warehoused material is determined to reach the corresponding life exhausting date soon, perform warehouse-out processing on the warehoused material.

Further, the material management and control system may further comprise an alarm 14. The alarm 14 may function to performing alarming when the processor 12 determines that the remaining life of any material to be warehoused is less than the set life value or determines that any warehoused material will reach the corresponding life exhausting date soon. In particular, the alarm 14 may perform alarming by the manner of short message communication alarming or signal alarming such as buzzer, signal lamp, etc., and while performing alarming, it may further simultaneously display the reason of generating alarm signals, for example, the remaining life of the material to be warehoused being low, or the warehoused material being about to reach the corresponding life exhausting date, and so on, and the embodiment of the present invention does not impose any restriction on it.

Further, in the embodiment of the present invention, with respect to any material to be warehoused, if the remaining life of the material to be warehoused is determined to be less than the set life value, the processor 12 may further perform material abnormal analyzing and processing operation on the material to be warehoused while or after it refuses to perform warehousing operation and perform alarming; or, with respect to any warehoused material, if the warehoused material is determined to reach the corresponding life exhausting date soon, the processor 12 may further perform material abnormal analyzing and processing operation on the warehoused material while or after it performs warehouse-out treatment on the warehoused material and performs alarming, so that the management personnel may perform corresponding subsequent maintenance treatment according to the result of the material abnormal analyzing and processing.

Performing material abnormal analyzing and processing operation on the material to be warehoused or the warehoused material may comprise: analyzing whether it is the alarming caused by abnormality of the system software, or it is the alarming caused by material quality abnormality, or it is the alarming caused by the material life expiring, or it is the alarm caused by the managerial personnel inputting wrong data or some other reasons.

The technical solution of the embodiment of the present invention can greatly avoid the problems of low management and control efficiency and relatively high error rate caused by manual material management, lower the risk of missing or mistake entries during manual material management, and achieve the computerization of the material management and control during the ODF process, so as to cause the material management and control manner is more standard, and can perform alarming in the case that the material product model is misused or the material used quantity does not comply with provision, or the life is expired and so on, so as to avoid the accident which might happen in the procedure of using the material, and avoid the loss caused by the material not used in time and the risk of using life expiring material, and remarkably improve the processing efficiency and accuracy of the material management and control.

Second Embodiment

The second embodiment of the present invention will give a detailed description on the operation flow of the material management and control system according to the first embodiment of the present invention, by taking sealant as an example of the material to be managed and controlled.

Figure 2:
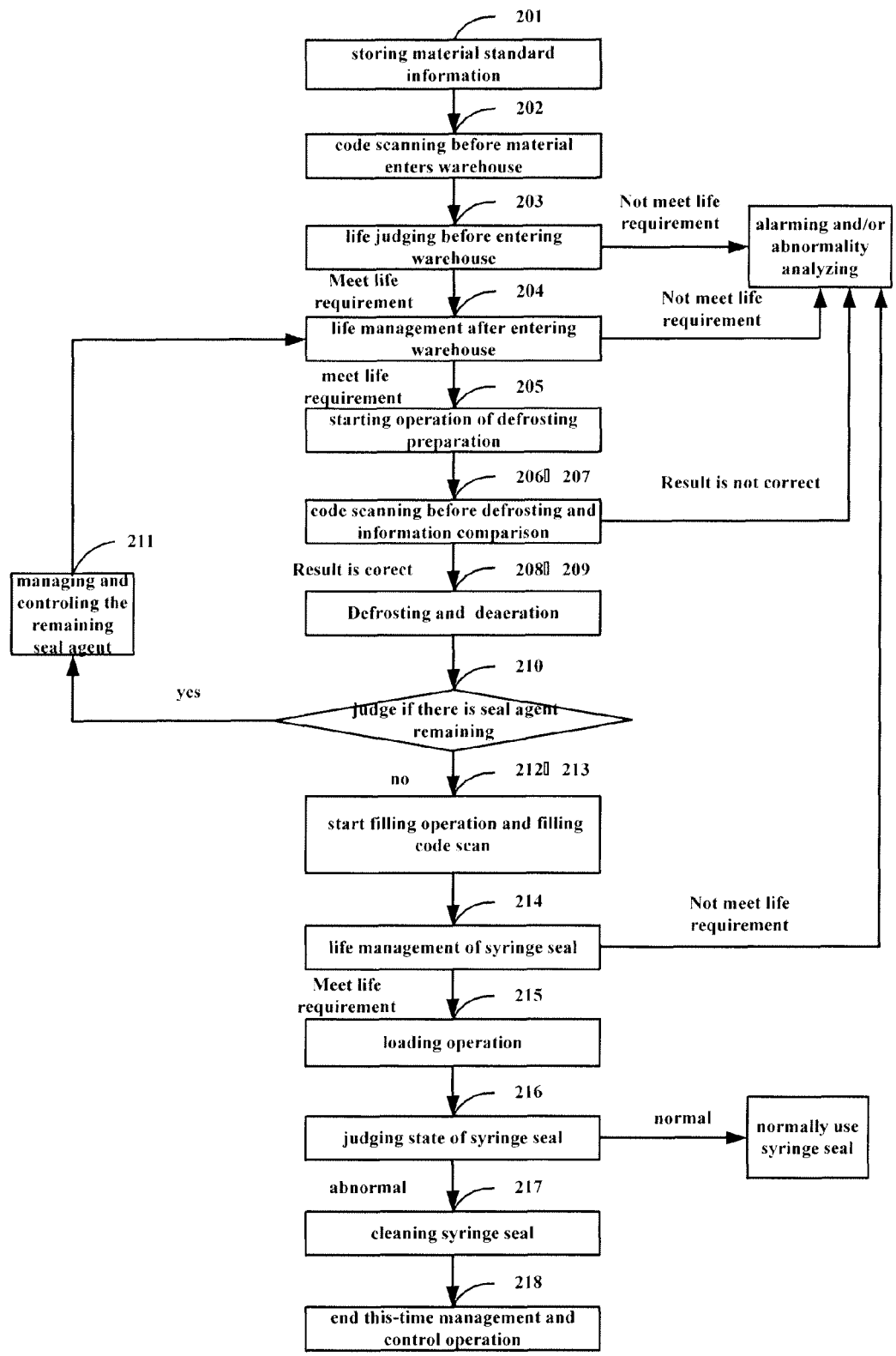
FIG. 2 is a schematic view illustrating an operation flow of a material management and control system according to a second embodiment of the present invention.

FIG. 2 is a schematic view illustrating an operation flow of a material management and control system according to the second embodiment of the present invention, and the operation flow may comprise the following steps:

Step 201: storing material standard information.

In particular, the material management and control operating staff may input the material standard information (Production Spec) related to present operations of sealant warehousing and processing into the memory of the material management and control system in advance, such as Cell Part Number of sealant, Defrost Time, Life of sealant after defrost, Syringe Seal Target, Syringe Seal Cooling Time, Syringe Seal Life after syringe, and so on, and the embodiment of the present invention does not impose any restriction on it.

Step 202: code scanning before the material enters warehouse (Fab In).

In particular, with respect to any material to be warehoused, the code scanning operation may be performed with the code scanner of the material management and control system according to pre-configured barcode for the material, to obtain the related code scanning parameter information of the material to be warehoused, wherein, except the life expiring date of the material to be warehoused, the obtained code scanning parameter information of the material to be warehoused may further comprise one or more of the following information: product model, product category, scanning date, scanning number, and so on, and the embodiment of the present invention does not impose any restriction on it; in present step 202, the code scanner may further perform code scanning on the operating staff performing entering warehouse operation at the same time, to obtain the serial number information of the operating staff performing present entering warehouse operation.

Step 203: life judging before entering warehouse.

In particular, the processor of the material management and control system may perform judging on the life of the sealant to be warehoused according to the code scanning parameter information obtained in step 202, if the result complies with the set life requirement, perform entering warehousing operation on the sealant to be warehoused, and perform step 204, if not, refuse to perform entering warehousing operation on the sealant to be warehoused, and trigger the corresponding alarm to perform alarming, and furthermore, the processor may perform abnormal analyzing and processing operation on the sealant to be warehoused and analyze the reason of generating abnormality.

Step 204: life management after entering warehouse.

In particular, after the material enters the warehouse, the processor may perform real time life management on the material, that is, judge in a real time manner whether it is about to reach the corresponding life exhausting date or not (or it may be termed as performing life expiring early-warning), if not, perform step 205; if yes, perform warehouse-out operation on the warehoused material and trigger the corresponding alarm to performing alarming, and may further perform abnormal analyzing and processing operation on the warehoused material, and analyze the reason of generating abnormality.

Step 205: starting operation of defrosting preparation.

In particular, before using syringe seal (that is, sealant), the operating staff needs to select the corresponding product model information (Cell Part Number) of the present material preparation, and select the corresponding defrosting number (that is, generating the task code of the present material preparation to define this event, and correspondingly, all data corresponding to the present defrosting operation will be included in this event); further, after selecting the corresponding product model information of the present material preparation, the corresponding product model information of the present material preparation may be stored in the memory of the material management and control system.

Step 206: code scanning before defrosting.

In particular, with respect to any syringe seal to be defrosted, the code scanner may perform second code scanning by using the barcode of the syringe seal, to obtain the second code scanning parameter information comprising information such as syringe seal product model and so on corresponding to the syringe seal.

Step 207: information comparison.

In particular, the processor may perform information comparison of the preselected product model information in step 205 and the product model information in the code scanning parameter information obtained in step 206, and if the comparison result of them are identical, perform step 208; if not, trigger the corresponding alarm to perform alarming (that is, inform the operating staff that the syringe seal does not match the needed syringe seal model and it is necessary to replace new syringe seal to perform defrosting operation).

Step 208: defrosting.

In particular, the processor may perform the present defrosting operation according to the preset material standard information in step 201, for example, automatically generate first (second) defrost end time according to the defrost time in the material standard information (Production Spec), and perform defrosting operation according to the first (second) defrost end time, and after completing the defrosting, generate and input the corresponding defrosting information to the memory, and for example after completing the defrosting, input the information of the corresponding first (second) defrost end time, the number of the defrosting operation staff, and so on into the memory.

Step 209: defoaming.

In particular, the processor may perform the present defoaming operation according to preset material standard information in step 201, and after completing the present defoaming operation, input the defoaming parameters involved in the present operation, such as viscosity, defoaming time, temperature after defoaming, total weight of presently used seal, serial number of defoaming operating staff, and so on, into the memory.

Step 210: judging whether there is sealant remaining, if yes, perform step 211, otherwise perform step 212.

Step 211: managing and controlling remaining sealant.

If it is judged that there is sealant (syringe seal) left, the code scanner may perform once again code scanning on the left sealant, and the processor may generate new sealant life parameters for the left sealant according to the syringe seal life after defrosting in the material standard information (Production Spec), and perform life management operation after warehouse entry described in step 204 on the remaining sealant.

Step 212: start filling operation.

In particular, after completing of the syringe seal defrosting and defoaming operations, the Cell Seal information will be decomposed to Syringe Seal information. Further, before performing syringe seal filling operation, the operating staff needs to select the present task code to define this event, and correspondingly, all data corresponding to the present Syringe Seal Filling will be incorporated into the present event.

Step 213: filling code scan.

After completion of filling, code scanning may be performed once more on the syringe seal to obtain the related parameter information corresponding to the present filling operation, such as syringe seal cooling starting time, syringe seal number, serial number of operating staff, and so on, and input the obtained related parameter information into the memory; further, the manner of manually inputting may be adopted to input information of the filling amount of the syringe seal and filling equipment number and so on into the memory, and the embodiment of the present invention does not impose any definition on it.

Step 214: life management of syringe seal.

After completion of placement in the normal temperature, the processor may automatically generate Syringe Seal Start Use Time, and start to perform counting down operation on Syringe Seal Pot Life at the same time, and when the remaining life of the syringe seal is not less than a set second life value, perform step 215, or, when the life of the syringe seal is about to reach the life exhausting date, for example, reach a set period of time (e.g., 5 hour) before the life exhausting, trigger the corresponding alarm to performing early warning, so as to remind the operating staff to use the syringe seal as soon as possible, to avoid the resource waste generated by the life expiring of the syringe seal.

Further, when the life of the syringe seal is exhausted, the processor may further generate syringe seal actual use end time, and store it into the memory.

Step 215: loading operation.

In particular, the processor may perform the matching operation of the syringe seal and the equipment head according to the code scanning information obtained through code scanning by the code scanner on the various heads of the sealant coating equipment, and according to the matching result, load the syringe seal into the sealant coating equipment by using the corresponding equipment head.

Step 216: judging state of syringe seal.

During the process of usage, the processor may judge in a real-time manner whether the syringe seal is abnormal or not, if the result is yes, then replace the syringe seal, and enter the syringe seal cleaning flow described in step 217; otherwise, the syringe seal is normally used until the life of the syringe seal is exhausted.

Step 217: cleaning syringe seal.

In particular, during performing syringe seal cleaning, it may be performed to code-scan on the syringe seal to be cleaned with the code scanner, and input the cleaning parameter information such as corresponding cleaning time into the memory after the cleaning.

Step 218: completing present management and control operation.

Third Embodiment

The third embodiment of the present invention will give a detailed description on the operation flow of the material management and control system in the first embodiment of the present invention, by taking liquid crystal as an example for the material to be managed and controlled.

Figure 3:
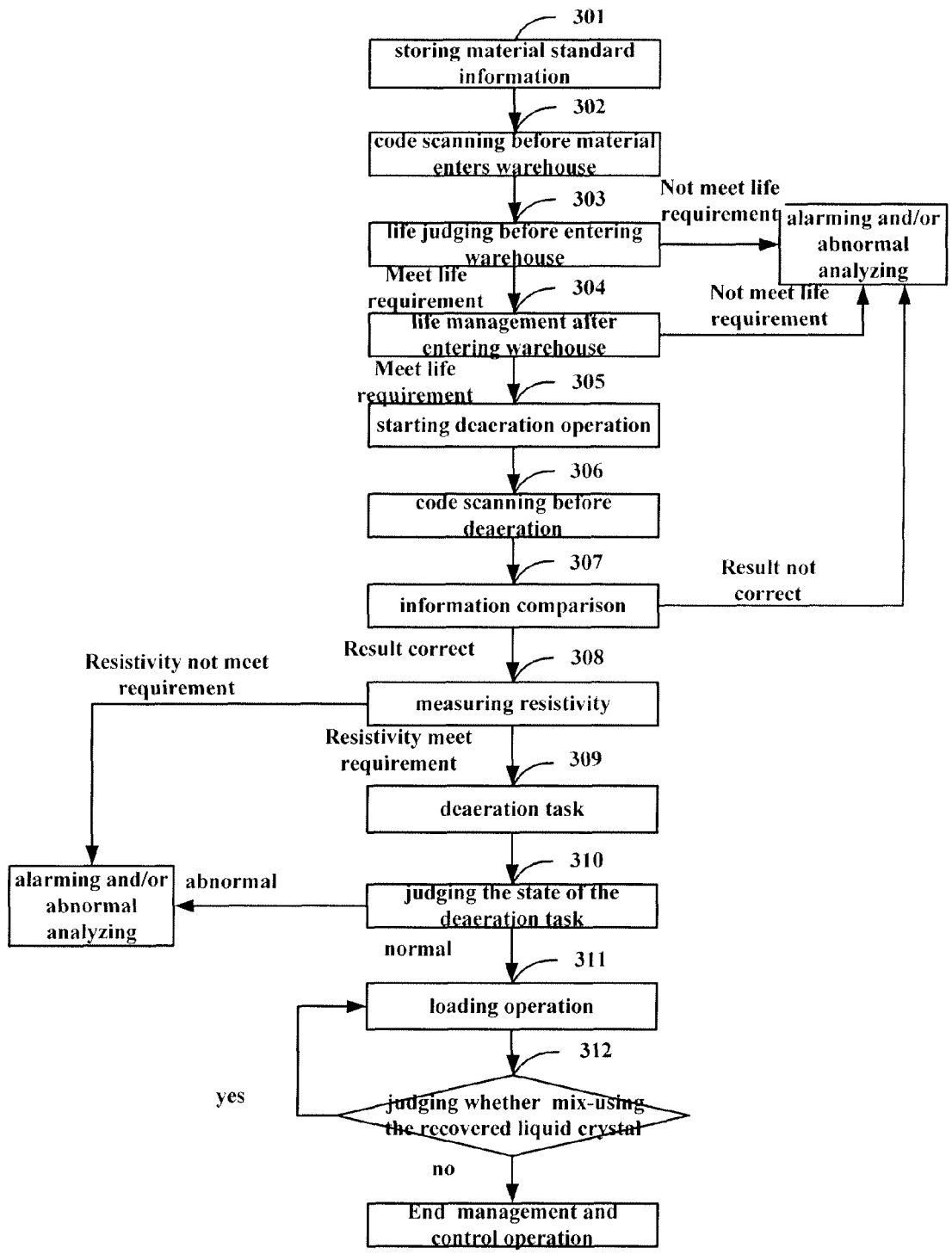
FIG. 3 is a schematic view illustrating an operation flow of a material management and control system according to a third embodiment of the present invention.

FIG. 3 is a schematic view illustrating an operation flow of the material management and control system, according to the third embodiment of the present invention, and the operation flow may comprise the following steps:

Step 301: storing material standard information.

In particular, the material management and control operating staff may input the material standard information (Production Spec) related to the present operations of liquid crystal warehousing and processing into the memory (system database) of the material management and control system in advance, such as product model of liquid crystal, resistivity of liquid crystal, time length of liquid crystal defoaming, whether it is to drop recovered liquid crystal and normal liquid crystal on the same liquid crystal display panel, and so on, and the embodiment of the present invention does not impose any restriction on it.

Step 302: code scanning before material enters warehouse (Fab In).

In particular, with respect to any material to be warehoused, the code scanning operation may be performed with the code scanner of the material management and control system according to the preconfigured barcode for the material, to obtain the related code scanning parameter information of the material to be warehoused. Except the life expiring date of the material to be warehoused, the obtained code scanning parameter information of the material to be warehoused may further comprise one or more of the following information: product model, product category, scanning date, scanning number, and so on, and the embodiment of the present invention does not impose any restriction on it. In the present step 302, at the same time the code scanner may further perform code scanning on the operating staff performing the entering warehouse operation, to obtain the serial number information of the operating staff performing the present entering warehouse operation.

Step 303: life judging before entering warehouse.

In particular, the processor of the material management and control system may judge the life of the liquid crystal to be warehoused according to the code scanning parameter information obtained in step 302, and if the result complies with the set life requirement, perform entering warehousing operation on the liquid crystal to be warehoused, and perform step 304, otherwise refuse to perform entering warehousing operation on the liquid crystal to be warehoused, and trigger the corresponding alarm to perform alarming, further, it may perform abnormal analyzing and processing operation on the liquid crystal to be warehoused and analyze the reason of generating abnormality.

Step 304: life management after entering warehouse.

In particular, after the material enters the warehouse, the processor may perform real-time life management on it, that is, judge in a real-time manner whether it is about to reach the corresponding life exhausting date or not (or it may be termed as performing life expiring early-warning), if the result is "not," perform step 305; if "yes," perform an warehouse-out operation on the warehoused material and trigger the corresponding alarm to performing alarming, and may further perform abnormal analyzing and processing operation on the warehoused material, and analyze the reason of generating abnormality.

Step 305: starting defoaming operation.

In particular, before starting defoaming operation, the operating staff need to select the corresponding product model information (Cell Part Number) of the present material preparation, and select the corresponding defoaming number (that is, generating the task code of the present material preparation to define this event, and correspondingly, all data corresponding to the present defoaming operation will be incorporated in this event); further, after selecting the corresponding product model information of the present material preparation, the corresponding product model information of the present material preparation may be stored in the memory of the material management and control system.

Step 306: code scanning before defoaming.

In particular, with respect to any liquid crystal to be deaerated, the code scanner may perform second code scanning with the barcode of the liquid crystal, to obtain the second code scanning parameter information comprising information such as the liquid crystal product model, resistivity and so on corresponding to the liquid crystal.

Step 307: information comparison.

In particular, the processor may perform information comparison of the preselected product model information and the product model information in the code scanning parameter information, and if the comparison result of them are identical, perform step 308; otherwise, trigger the corresponding alarm to perform alarming (that is, inform the operating staff that the liquid crystal does not match the needed liquid crystal model, and it is necessary to replace new liquid crystal to perform subsequent defoaming operation) and enter the abnormality analyzing and processing flow.

Step 308: measuring resistivity.

In particular, the processor may perform information comparing operation on the resistivity parameter information in the code scanned parameter information of the liquid crystal and the liquid crystal resistivity parameter information in preset material standard information, if the comparison result is identical, then perform step 309; otherwise, trigger the corresponding alarm to perform alarming and enter the abnormality analyzing and processing flow.

Step 309: defoaming task.

In particular, the processor may perform defoaming processing operation on the liquid crystal according to the preset material standard information, and after completing the present defoaming operation, input the related defoaming parameters during the present operation, such as viscosity, defoaming time, temperature after defoaming, total dose of the liquid crystal used the present operation, serial number of the defoaming operating staff and so on, into the memory.

Step 310: judging the state of the defoaming task.

In particular, the processor may judge whether the defoaming task is abnormal or not according to the liquid crystal defoaming parameters in the preset material standard information an so on, if the result is yes, then trigger the corresponding alarm to perform alarming and enter the abnormality analyzing and processing flow; otherwise, perform step 311.

Step 311: loading operation.

In particular, the processor may complete the binding between the equipment head and liquid crystal bottle according to the code scanning information obtained by performing code scanning on the equipment head and the liquid crystal bottle by the code scanner, and according to the binding result, load the liquid crystal bottle into the liquid crystal coating equipment by using the corresponding equipment head.

Step 312: judging whether there is mixed usage of the recovered liquid crystal or not.

In particular, the processor may judge whether the liquid crystal bottle recovers liquid crystal or not according to the liquid crystal code information, and may judge whether it is to drop the recovered liquid crystal and normal liquid crystal on the same liquid crystal display panel at the same time according to the feedback information upload by the liquid crystal coating equipment, and if there occurs the case of mixed usage, then bind the equipment head and the liquid crystal bottle again, and if there is no mixed usage, then complete this time management and control operation.

Fourth Embodiment

The fourth embodiment of the present invention will give a detailed description on the operation flow of the material management and control system in the first embodiment of the present invention, by taking the mixture of gold balls and glass fibers (such as silicon ball) as an example for the material to be managed and controlled.

Figure 4:
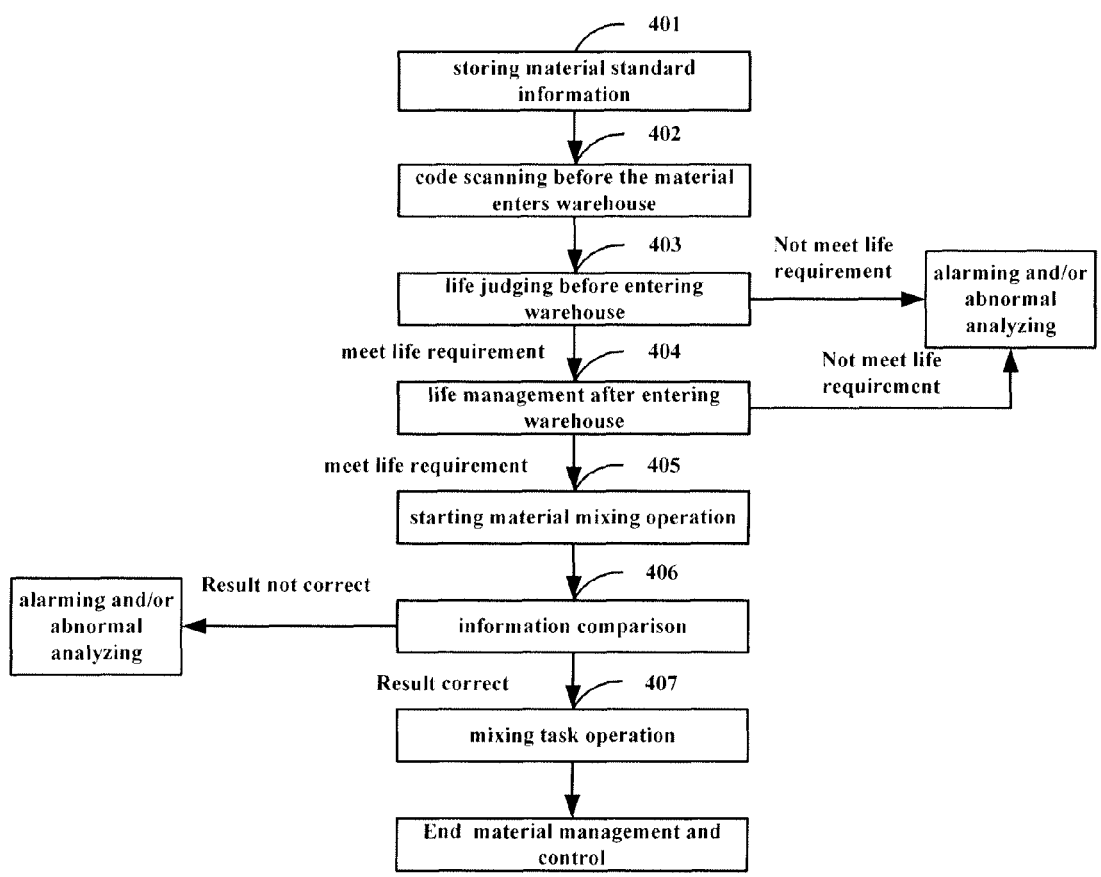
FIG. 4 is a schematic view illustrating an operation flow of a material management and control system according to a fourth embodiment of the present invention.

FIG. 4 is a schematic view illustrating an operation flow of the material management and control system, according to the fourth embodiment of the present invention, and the operation flow may comprise the following steps:

Step 401: storing material standard information.

In particular, the material management and control operating staff may input the material standard information (Production Spec) related to the present warehousing and processing operations of the mixture of gold balls and glass fibers into the memory (system database) of the material management and control system in advance, such as product model and mixing ratio of the mixture of gold balls and glass fibers, the corresponding standard mixing parameter information when performing the mixing operation on the mixture of gold balls and glass fibers and the corresponding sealant, and so on, and the embodiment of the present invention does not impose any restriction on it.

Step 402: code scanning before the material enters warehouse.

In particular, with respect to any material to be warehoused, the code scanning operation may be performed with the code scanner of the material management and control system according to preconfigured barcode for the material, to obtain the related code scanning parameter information of the material to be warehoused. Except the life expiring date of the material to be warehoused, the obtained code scanning parameter information of the material to be warehoused may further comprise one or more of the following information:

product model, product category, scanning date, scanning number, and so on of the material to be warehoused, and the embodiment of the present invention does not impose any restriction on it. In the present step 402, at the same time the code scanner may further perform code scanning on the operating staff performing entering warehouse operation, to obtain the serial number information of the operating staff performing entering warehouse operation of this time.

Step 403: life judging before entering warehouse.

In particular, the processor of the material management and control system may perform judging on the life of the mixture of gold balls and glass fibers to be warehoused according to the code scanning parameter information obtained in step 402, if the result complies with the set life requirement, perform entering warehousing operation on the mixture of gold balls and glass fibers to be warehoused, and perform step 404; otherwise, refuse to perform entering warehousing operation on the mixture of gold balls and glass fibers to be warehoused, and trigger the corresponding alarm to perform alarming, and furthermore, it may perform abnormal analyzing and processing operation on the mixture of gold balls and glass fibers to be warehoused and analyze the reason of generating abnormality.

Step 404: life management after entering warehouse.

In particular, after the material enters the warehouse, the processor may perform real-time life management on the material, that is, judge in a real-time manner whether it is about to reach the corresponding life exhausting date or not (or it may be termed as performing life expiring early-warning), if not, perform step 405; and if yes, perform warehouse-out operation on the warehoused material and trigger the corresponding alarm to performing alarming, and may further perform abnormal analyzing and processing operation on the warehoused material, and analyze the reason of generating abnormality.

Step 405: starting material mixing operation.

In particular, before performing the material mixing operation, the operating staff need to select the corresponding product model information (Cell Part Number) of the present material preparation, and with respect to the mixture of gold balls and glass fibers to be processed, perform code scanning by using the barcode of the mixture of gold balls and glass fibers to obtain code scanning parameter information such as the product model corresponding to the mixture of gold balls and glass fibers and the serial number of the corresponding operating staff and so on; furthermore, after selecting the product model information corresponding to the present material preparation, the product model information corresponding to the present material preparation may be stored in the memory of the material management and control system.

Step 406: information comparison.

In particular, the processor may perform information comparison of the preselected product model information and the product model information in the code scanning parameter information, and if the comparison result of them are identical, then perform step 407; otherwise, trigger the corresponding alarm to perform alarming (that is, inform the operating staff that the mixture of gold balls and glass fibers does not match the needed model of the mixture of gold balls and glass fibers, and that it necessary to replace new mixture of gold balls and glass fibers to perform subsequent defoaming operation).

Step 407: mixing task operation.

In particular, the processor may perform the present mixing task operation according to the preset material standard information in step 401, that is, perform mixing operation on the mixture of gold balls and glass fibers and the corresponding sealant according to the mixing operation parameter information in the preset material standard information, and after completing the present mixing task operation, input the related mixing mask parameters during the present mixing task operation, such as time length of the mixing task operation, the serial number of the operating staff and so on, into the memory.

Further, after completing the mixing processing operation, the processor may further perform operations such as defoaming, filling processing etc. on the obtained mixture after performing mixing task processing operation, according to the sealant defoaming parameter information and sealant filling parameter information in the preset material standard information.

Obvious, those with ordinary skills in the art may make various modifications and changes to the present invention without departing the spirit and scope of the present invention. In this way, if these modifications and changes of the present invention belong to the scope of the claims of the present invention and its equivalent technology, the present invention is intended to comprise these modifications and changes.

The invention claimed is:

1. A material management and control system, comprising:
 a code scanner, which performs a code scanning operation on material to be warehoused to obtain code scanning parameter information of the material to be warehoused, wherein the code scanning parameter information comprises at least a date when a life of the material to be warehoused is exhausted; and
 a processor, which determines whether a remaining life of the material to be warehoused is not less than a set life value or not according to the code scanning parameter information, and if a result is yes, then perform a warehousing operation on the material to be warehoused, resulting in the material to be warehoused becoming recognized as warehoused material, and monitor whether the warehoused material arrives at the date when a life of the material to be warehoused is exhausted, or not, and if the result is not, then perform a subsequent material processing operation on the warehoused material according to a set operation procedure;
 wherein the material to be warehoused or the warehoused material comprises a sealant;
 wherein where the warehoused material is the sealant, the processor performs the subsequent material processing operation on the warehoused material according to the following set operation flow:
  receiving second code scanning parameter information obtained when the code scanner performs a second code scanning operation, wherein the second code scanning parameter information comprises at least product model information of the sealant;
  performing an information comparison between the product model information of the sealant and preset product model information needed by a present material processing operation, and if a result of the information comparison is identical, sequentially performing operations of defrosting and defoaming treatment according to sealant defrosting parameter information and sealant defoaming parameter information in a preset material standard information; and
  performing a filling treatment operation of the sealant after performing the defrosting and defoaming treatment according to sealant filling parameter information in the preset material standard information, and when the life of the sealant after performing the filling treatment operation is not less than a preset second life value, loading the sealant after performing the filling treatment operation into a sealant coating equipment, to complete the operation of loading the sealant into the equipment, wherein the present material standard information comprises the product model information of the sealant, the sealant defrosting parameter information, the sealant defoaming parameter information and the sealant filling parameter information.

2. The material management and control system of claim 1, wherein the code scanning parameter information of the material to be warehoused further comprises one or more of the following information: product model, product category, manufacturer, scanning number, and scanning date of the material to be warehoused.

3. The material management and control system of claim 1, wherein, with respect to any material to be warehoused, if the remaining life of the material to be warehoused is determined to be less than the set life value, the processor refuses to perform warehousing operation on the material to be warehoused; or, with respect to any warehoused material, if the warehoused material is determined to reach the corresponding life exhausting date soon, the processor performs warehouse-out processing on the warehoused material.

4. The material management and control system of claim 1, further comprising an alarm, wherein when the processor determines that the remaining life of any material to be warehoused is less than the set life value or determines that any warehoused material will reach the corresponding life exhausting date soon, the alarm performs alarming.

5. The material management and control system of claim 1, further comprising a memory, which stores the preset material standard information and the product model information needed by the present material processing operation.

6. The material management and control system of claim 5, wherein the memory further stores the code scanning parameter information and the second code scanning parameter information.

7. The material management and control system of claim 2, wherein, with respect to any material to be warehoused, if the remaining life of the material to be warehoused is determined to be less than the set life value, the processor refuses to perform warehousing operation on the material to be warehoused; or, with respect to any warehoused material, if the warehoused material is determined to reach the corresponding life exhausting date soon, the processor performs warehouse-out processing on the warehoused material.

8. The material management and control system of claim 2, further comprising an alarm, wherein when the processor determines that the remaining life of any material to be warehoused is less than the set life value or determines that any warehoused material will reach the corresponding life exhausting date soon, the alarm performs alarming.

9. The material management and control system of claim 3, further comprising an alarm, wherein when the processor determines that the remaining life of any material to be warehoused is less than the set life value or determines that any warehoused material will reach the corresponding life exhausting date soon, the alarm performs alarming.

10. The material management and control system of claim 3, wherein the material to be warehoused or the warehoused material comprises one or more of the following materials: sealant, liquid crystal, and mixture of gold balls and glass fibers.

11. The material management and control system of claim 4, wherein the material to be warehoused or the warehoused material comprises one or more of the following materials: sealant, liquid crystal, and mixture of gold balls and glass fibers.

12. A material management and control system, comprising:
a code scanner, which performs a code scanning operation on material to be warehoused to obtain code scanning parameter information of the material to be warehoused, wherein the code scanning parameter information comprises at least a date when a life of the material to be warehoused is exhausted; and
a processor, which determines whether a remaining life of the material to be warehoused is not less than a set life value or not according to the code scanning parameter information, and if a result is yes, then perform a warehousing operation on the material to be warehoused, resulting in the material to be warehoused becoming recognized as warehoused material, and monitor whether the warehoused material arrives at the date when a life of the material to be warehoused is exhausted, or not, and if the result is not, then perform a subsequent material processing operation on the warehoused material according to a set operation procedure;
wherein the material to be warehoused or the warehoused material comprises one or more of the following materials: a liquid crystal;
wherein where the warehoused material is the liquid crystal, the processor performs the subsequent material processing operation on the warehoused material according to the following set operation flow:
receiving second code scanning parameter information obtained when the code scanner performs a second code scanning operation on the liquid crystal, wherein the second code scanning parameter information comprises at least product model information of the liquid crystal and resistivity parameter information of the liquid crystal;
performing an information comparison between the product model information of the liquid crystal and a preset product model information needed by a present material processing operation, and if a result of the information comparison is identical, further performing second information comparison between the resistivity parameter information of the liquid crystal and preset resistivity parameter information of the liquid crystal in a preset material standard information, if a result of the second information comparison is identical, performing a defoaming treatment operation according to liquid crystal defoaming parameter information in the preset material standard information, and after performing the defoaming treatment operation, loading the liquid crystal into a preset liquid crystal coating equipment, to complete the operation of loading the liquid crystal into the equipment, wherein the present material standard information comprises the product model information of the liquid crystal, the preset resistivity parameter information, and the liquid crystal defoaming parameter information.

13. The material management and control system of claim 12, further comprising a memory, which stores the preset material standard information and the product model information needed by the present material processing operation.

14. The material management and control system of claim 13, wherein the memory further stores the code scanning parameter information and the second code scanning parameter information.

15. A material management and control system, comprising:
   a code scanner, which performs a code scanning operation on material to be warehoused to obtain code scanning parameter information of the material to be warehoused, wherein the code scanning parameter information comprises at least a date when a life of the material to be warehoused is exhausted; and
   a processor, which determines whether a remaining life of the material to be warehoused is not less than a set life value or not according to the code scanning parameter information, and if a result is yes, then perform a warehousing operation on the material to be warehoused resulting in the material to be warehoused becoming recognized as warehoused material, and monitor whether the warehoused material arrives at the date when a life of the material to be warehoused is exhausted, or not, and if the result is not, then perform a subsequent material processing operation on the warehoused material according to a set operation procedure;
   wherein the material to be warehoused or the warehoused material comprises a mixture of gold balls and glass fibers;
   wherein where the warehoused material is the mixture of gold balls and glass fibers, the processor performs the subsequent material processing operation on the warehoused material according to the following set operation flow:
      receiving second code scanning parameter information of the mixture of gold balls and glass fibers obtained when the code scanner performs a second code scanning operation on the mixture of gold balls and glass fibers, wherein the second code scanning parameter information comprises at least product model information of the mixture of gold balls and glass fibers;
      performing an information comparison between the product model information of the mixture of gold balls and glass fibers and a preset product model information needed by a present material processing operation, and if a result of the information comparison is identical, according to mixing operation parameter information in preset material standard information, performing a mixing processing operation on the mixture of gold balls and glass fibers and a sealant needed by the present material processing operation, and after the mixing processing operation, sequentially performing defoaming and filling processing operations on mixed material obtained after the mixing processing operation, according to sealant defoaming parameter information and sealant filling parameter information in the preset material standard information, wherein the preset material standard information comprises the product model information and the mixing operation parameter information.

16. The material management and control system of claim 15, further comprising a memory, which stores the preset material standard information and the product model information needed by the present material processing operation.

17. The material management and control system of claim 16, wherein the memory further stores the code scanning parameter information and the second code scanning parameter information.

* * * * *